US007490768B2

(12) United States Patent
Seliger et al.

(10) Patent No.: US 7,490,768 B2

(45) **Date of Patent: *Feb. 17, 2009**

(54) ELECTION SYSTEM ENABLING COERCION-FREE REMOTE VOTING

(75) Inventors: Frank Seliger, Altdorf (DE); Bernard Van Acker, Borgerhout (BE)

(73) Assignee: International Business Machines Corporation, Armonk, NY (US)

( * ) Notice: Subject to any disclaimer, the term of this patent is extended or adjusted under 35 U.S.C. 154(b) by 632 days.

This patent is subject to a terminal disclaimer.

(21) Appl. No.: 11/174,760

(22) Filed: Jul. 5, 2005

(65) Prior Publication Data

US 2006/0000905 A1 Jan. 5, 2006

(30) Foreign Application Priority Data

Jul. 5, 2004 (EP) ................................. 04103167

(51) Int. Cl.
*G06F 17/60* (2006.01)

(52) U.S. Cl. ..................................... 235/386; 235/50 F

(58) Field of Classification Search ................. 235/386, 235/435, 437, 50 B, 50 F, 50 R
See application file for complete search history.

(56) References Cited

U.S. PATENT DOCUMENTS

| | | | | |
|---|---|---|---|---|
| 5,731,575 A | | 3/1998 | Zingher et al. | |
| 6,081,793 A | * | 6/2000 | Challener et al. | 705/50 |
| 6,092,051 A | * | 7/2000 | Kilian et al. | 705/12 |
| 2007/0267492 A1 | * | 11/2007 | Maclaine Pont | 235/386 |

FOREIGN PATENT DOCUMENTS

| | | |
|---|---|---|
| EP | 04368014.9 | 2/2004 |
| WO | WO 01/55940 A1 | 2/2001 |

OTHER PUBLICATIONS

Magkos, Burmester and Chrissikopoulos, “Receipt-freeness in Large-scale Elections without Untappable Channels,” First IFIP Conference on e-Commerce, E-Business, E-Government (13E), pp. 683-694, 2001.

Juels and Jakobsson, “Coercion-Resistant Electronic Elections,” 2002.

* cited by examiner

*Primary Examiner*—Daniel St. Cyr
(74) *Attorney, Agent, or Firm*—Patrick J. Daugherty; Driggs, Hogg, Daugherty & Del Zoppo Co., LPA

(57) ABSTRACT

Election system enabling coercion-free remote voting wherein a remote voter transmits his/her selected vote to the election authority through a data transmission network such as the Internet network by using a host computer having a card reader, the vote being transmitted after the voter has introduced an identifying smart card into the card reader. At least one secret code is recorded into the smart card at the location of the election authority at the moment when the latter delivers the smart card, the secret code having to be input by the voter into the host computer when the voter wants to vote during an election in order for the vote to be transmitted to the election authority and validated by the election authority.

8 Claims, 4 Drawing Sheets

ELECTION SYSTEM ENABLING COERCION-FREE REMOTE VOTING

TECHNICAL FIELD

The invention relates to the systems being used to allow remote voters to transmit their vote through a data transmission network such as the Internet network and in particular relates to a system enabling coercion-free remote voting.

BACKGROUND OF THE INVENTION

Systems are currently being tested and rolled out to permit remote electronic voting. One of the main problems in the remote e-voting systems is that, contrary to voting in a voting office, they do not offer any protection against vote buying or vote coercion. Indeed, although the vote is secret as long as the voter does not collaborate, it is still possible for the voter to disclose his choice to a third person and at the same time to prove what he has voted.

In the system disclosed in U.S. Pat. No. 5,731,575, a user can covertly alert the system that he/she is under coercion by entering a false (Personal Identification Number) PIN. The system can then take action. However, it requires an extra organization that will have to detect and react upon the fraud. Also, this system does not protect against possible pressure coming from an organizing person such as the one having to respond to personal distress signals. Furthermore, it requires the voter to remember a different sequence of numbers be it easy to derive from his correct PIN.

In the patent application WO 00155940, a system is proposed to use the one-time pad in order to guarantee the secrecy of the votes. In this scheme, election codes associated with candidates are given to the user secretly and with authenticity. This code-candidate association is different for each voter so that someone tapping the communication between the voter and the authority, will never know the vote. So, provided the credentials are distributed secretly, this system guarantees the secrecy of the vote unconditionally. But, the protection against coercion at the same level as in-booth voting is not provided here. Although the duress pin and the false code is mentioned, none of them is provided through a one-time in-booth secret action. Also, because the choices are pre-encrypted and the association code-candidate is displayed on the ballot, it is admitted that copying or photographing the ballot can provide evidence of how the vote was cast. Unless in case of a two part ballot, mixing parts between ballots would make the combination invalid. But the latter sentence presupposes that at least one of the parts is handed over secretly to the voter before each election, thereby strongly reducing the benefit of remote elections.

Another system is disclosed in the article of Magkos, Burmester and Chrissikopoulos "receipt-freeness in large-scale election" without untappable channels. This proposed system is using smartcards that use randomness from both the voter and the program on the smartcard itself to produce encrypted votes. The smartcard system proves to the user which encryption represents his correct vote before the vote is cast. Thus, the system avoids any use of untappable channels including the visit to a voting booth. But the problem with such a system is that, by forcing the voter to be merely an interface to the system for the coercer (the coercer chooses the randomness and verifies the encryption afterwards), coercion can take place. Also, this system does not intend to prevent the risk that the coercer would observe the voter while voting.

OBJECTS AND SUMMARY OF THE INVENTION

Accordingly, A first object of the invention is to provide an election system of remote voting relying on a one-time secret action in a permanent voting booth which prevents any coercer from knowing how the vote is being cast by the voter even if the coercer imposed a choice in advance to the voter.

A second object of the invention is to provide an election system of remote voting wherein there is no evidence on how the vote is being cast even if a coercer watches the voter during the very moment of voting.

A third object of the invention is to provide a method of remote voting using a smart card wherein the card remains valid even in case of coercion to the voter.

The invention therefore relates to an election system enabling coercion-free remote voting wherein a remote voter transmits his/her selected vote to the election authority through a data transmission network such as the Internet network by using a host computer having a card reader, the vote being transmitted after the voter has introduced an identifying smart card into the card reader. The voter records himself at least one secret code into the smart card at the location of the election authority at the moment when the latter delivers the smart card. Later, when the voter wants to vote during an election, this secret code has to be input by the voter into the host computer in order for the vote to be transmitted to the election authority.

According to an important aspect of the invention, the host computer generates several dummies different from the secret code when the voter records the secret code into the smart card, the dummies being also recorded into the smart card and being displayed to the voter. This one inputs in the computer one of these dummies if he is forced by a coercer to choose a vote different from his own choice so that the vote transmitted to the election authority so that the vote being transmitted to said election authority is modified using shuffling or addition modulo a certain number and therefore is not the vote as witnessed by or shown to the coercer.

According to another aspect of the invention, when the election is a referendum, there is only one dummy and the voter has to choose YES instead of NO or reciprocally, so that it is sufficient for the system to revert the vote in such a case, in order to obtain a true vote.

BRIEF DESCRIPTION OF THE DRAWINGS

The above and other objects, features and advantages of the invention will be better understood by reading the following more particular description of the invention in reference to the following drawings.

DETAILED DESCRIPTION OF THE DRAWINGS

Figure 1:
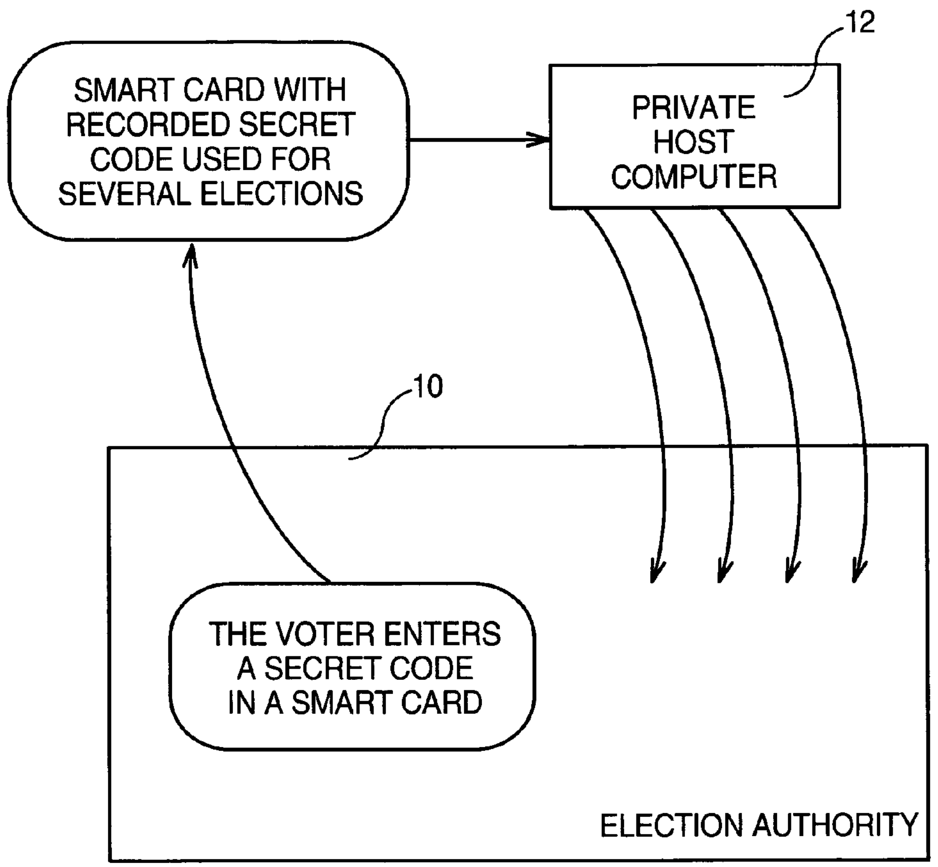
FIG. 1 is a schematic representation of the system according to the invention wherein a secret code is recorded by the voter in a smart card used for several elections.

Referring to FIG. 1, the main idea of the invention is that the government or the election authority 10 gives to each voter a smart card (identity card or voting card) on which keys or elections tokens representing electronic voting ballots are stored for several elections in advance.

When the card is given to the voter by the election authority, the voter has to record a secret code of his choice in a secret place which is preferably a voting booth located in the premises of the election authority. Such a secret code can be a number, for example between 0 and 9, or a word or a character/sequence wherein each character is a figure or a letter. Then, for each election, the voter has to enter the smart card in a reader of his private host computer 12 and to enter the secret code which has been recorded in the card.

While there is an "investment" of the voter when the card is given by the election authority since he has to be present physically and to accomplish a secret action, this investment is being reused several times afterwards during subsequent elections.

The consequence of the secret code being recorded in the card will consist of either shuffling existing codes (election tokens) on the card, or else scrambling existing codes on the card as described later. The main idea of the proposed techniques and procedures is to make it impossible for the voter to prove to an outside person what he votes using the card even if a coercer is present at the casting of the vote by the voter. Assuming that a coercer steals the card, the coercer will be able to pretend he is the real voter and make an attempt to vote but he will never know what he actually votes. As a consequence, any attempt to coerce the voter into voting something else will be useless since the voter is in the same situation as a voter who is voting in a traditional voting office and who can pretend what he wants over his voting behavior since no one will be able to verify.

Figure 2:
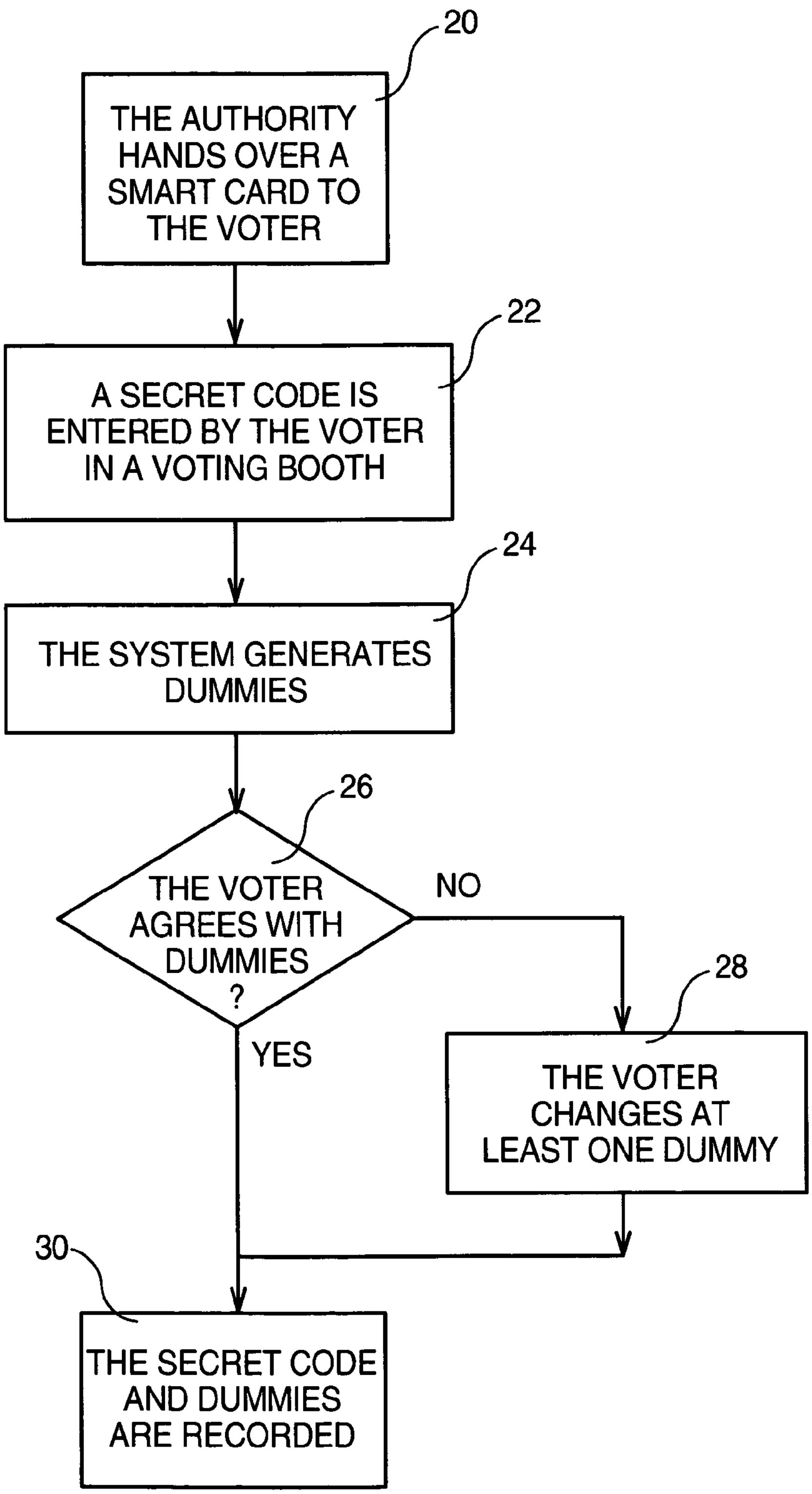
FIG. 2 is a flow chart representing the steps used to make operational the smart card given to each voter.

Accordingly, the steps involved in the recording procedure starts according to FIG. 2 when the election authority hands over the smart card to the voter (step 20). Then the voter enters a secret code as already mentioned (step 22). In order to solve the problem of coercion as explained hereafter, the system generate dummies (step 24). The system shows those dummies to the voter and allows him to change one or more dummies if he wants (step 26). The latter case can be necessary if the coercer has tried to force the user into entering a particular choice. Therefore, after the voter has changed one or several dummies (step 28) or not, the system stores the chosen secret code on the card as protected information and the secret code plus dummies as public information (step 30).

At voting, the voter is presented with all of them and is instructed to use the secret code during the voting unless there is a coercer. In the latter case, the voter can use a dummy as explained herein below.

Before sending the vote to the election authority, the system encrypts it with an encryption key which is different for all elections wherein the voter may use the secret code recorded in the smart card. Assuming that the vote is represented by a number of 4 figures, each key is also a number of 4 figures which could be the following for elections from 2004 to 2007:

| Election | Key |
|---|---|
| 2004/1 | 1 8 4 9 |
| 2004/2 | 1 8 6 1 |
| 2004/3 | 3 5 5 5 |
| 2005/1 | 7 5 0 1 |
| 2005/2 | 8 3 4 5 |
| 2005/3 | 4 6 1 1 |
| 2006/1 | 7 2 8 1 |
| 2006/2 | 2 4 5 6 |
| 2006/3 | 3 2 9 2 |
| 2007/1 | 5 2 0 0 |

In a preferred embodiment, the encryption key results from a group of trustees before the card is handed over to the citizen. The method being used is similar to the method described in EP 04368014.9 or in WO 00155940A wherein each trustee, on his turn, encrypts the received key with his own key before passing the card to the next trustee. Assuming that the encryption is an addition modulo 10, each trustee adds his own key modulo 10 to the key resulting from the encryption by the preceding trustee. Due to the nature of the smart card, the resulting number can be hidden from the trustees. They know and will remember only their own key plus the associated index enabling to retrieve in their database the key corresponding to a voter when the card is received by the election authority. Thus, assuming there are three trustees, the encryption key for the election 2004/1 is obtained as follows:

- the first trustee records key 2518,
- the second trustee encrypts the received key 5879. Accordingly, the intermediate key is 7387.
- the third trustee encrypts the received key 4562. Accordingly, the definite key to be used is 1849.

PREFERRED EMBODIMENT

Inside the secret booth located in the premises of the election authority, and just after having received his smart card containing the combined keys from the trustees, the voter inputs the card into a card reader. The program allows the voter to perform the secret action, e.g. enter secret code such as a word. It is assumed here that the voter chooses animal name "horse" which is recorded in the card. Then, the system generates other names like "cow", "hippo", "kangaroo" and "snake" which are dummy words. The system shows those dummies to the voter and allows him to change one or more of them. The latter case can be necessary if the coercer has tried to force the user into entering a particular choice. For example, the coercer wants the voter to have "salamander" as his choice and warned the voter about that before he gets his card and performs the secret action. Since the voter is allowed to change one of the dummies, he may change for example "hippo" into "salamander". Note that, as described later, the system associates a number with each name which has been selected.

Figure 3:
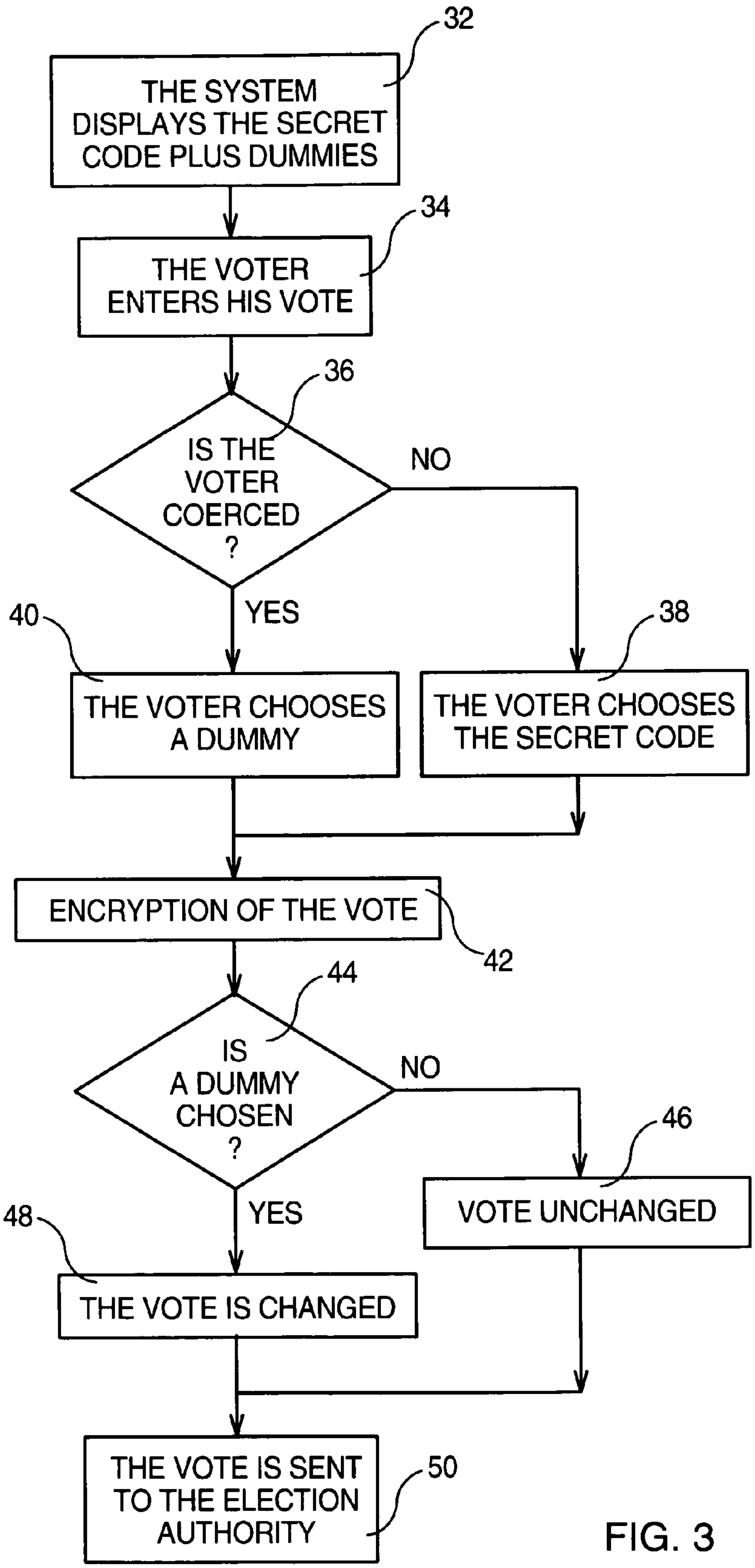
FIG. 3 is a flow chart representing the steps being implemented when a voter has to vote using the system according to the invention.

Now, assuming that the voter wants to vote remotely, that is electronically from his private host computer. The steps to implement are the following as illustrated in FIG. 3. First, the system displays the secret code and the dummies to the voter after this one has entered the card in the card reader (step 32). Then the voter enters his vote into the computer (step 34). At this stage, the question is whether the voter is coerced (step 36). If not, the voter chooses the secret code (step 38). If he is coerced, the voter chooses a dummy (step 40). After that, the vote is encrypted (step 42) and it is checked whether a dummy has been chosen by the voter (step 44). If not, the vote is left unchanged (step 46). On the contrary, the vote is changed (step 48). Finally, the system sends the vote (changed or unchanged) to the election authority (step 50).

As an example, it is assumed that, for the election 2004/1, the voter intends to vote "3355" meaning list 3 candidate 355, the voter, if not coerced chooses "horse" which is indeed his secret code (but no one is able to check). The system on the smart card will use the key 1849 corresponding to election 2004/1 and no other key to encrypt the vote yielding 4194 which can be transmitted publicly. The vote will then be decrypted by the trustees sequentially (to guarantee the secrecy of the vote) which will yield 3355 again, that is the correct plaintext vote.

It is assumed now that a coercer forces a voter to vote 6178. The system on the card associates vote 6178 with the key 1849 which yields 7917. Then, the coerced voter (or the coercer himself) chooses "cow", "snake", "hippo", "kangaroo" or "salamander" if it was the word imposed by the coercer (which is not the secret code but no one may check it). The system determines that such a choice does not correspond to the secret code "horse" and associates this choice with a number different from the number corresponding to the voter secret code. Thus, if number 3 corresponds to "horse" whereas number 6 is associated with "salamander", which is the selected word, the system deducts the difference 3 from the encrypted code 7917 which will yield the false encrypted vote 4684 which is transmitted. The vote will then be decrypted by the trustees sequentially which will yield the false (or blanco) vote 3845.

ALTERNATIVE EMBODIMENT

The operation inside the booth is the same as above. But, the system will use the key 4172 corresponding to the addition of 3 (associated with the secret code) to the key 1849. Assuming that the voter is not coerced, he chooses "horse" associated with number 3. The system will deduct 3 from the changed key 4172 to get 1849 again. The system then uses the real key to encrypt the vote, for example 3355 as previously, yielding 4194. The vote will then be decrypted sequentially by the trustees, which will yield 3355 again.

It is assumed now that a coercer forces the voter to vote 6178. The coerced voter (or the coercer himself) chooses for instance "salamander" associated with number 6. The system deducts 6 from all the figures of the augmented key 4172 to get the false key 8516 (even if it were to be disclosed, no one would be able to verify that it is a false key). With this false key, the vote is encrypted to get vote 4684, which can be sent over a public channel to the administrators/trustees. There, the vote will be decrypted by the trustees sequentially which will yield the vote 3845, which can be false or blanco, but in any case unpredictable and unverifiable for the coercer.

SPECIFIC EMBODIMENT

This specific embodiment corresponds to an election wherein there is a reduced number of candidates which can be each associated with a small number such as a figure when the number of candidates is equal or less than 10.

In such a case, the system generates a number of dummies such that the total number of the secret code plus the dummies is equal to 10, each secret code or dummy being associated with a figure as follows:

cow (dummy) associated with 0
snake (dummy) associated with 1
horse (secret code) associated with 2
butterfly (dummy) associated with 3
bird (dummy) associated with 4
kangaroo (dummy) associated with 5
salamander (dummy) associated with 6
dog (dummy) associated with 7
cat (dummy) associated with 8
lion (dummy) associated with 9

It is assumed that the candidates are the following:

1. Ian Jannsen
2. Peter Persen
3. Bernard Bernardsen
4. Julie Junesco
5. Jacob Jakobson
6. Petra Fergusson
7. Jacques Frere
8. Nathalie Cactus The voter wants to vote for candidate no 3, Bernard Bernardsen. In the absence of coercer, there is no problem. The voter enters the secret code, that is horse associated with 2. Then, there are two ways. In the preferred embodiment, the system will use the key 1849 (corresponding to election 2004/1) yielding 4172 which can be transmitted publicly. The received vote is then decrypted by the trustees sequentially, which will yield 3 corresponding to the candidate Bernard Bernardsen who has been chosen by the voter.

In the alternative embodiment, it is not key 1849 which is used, but a new key 3061 resulting from the addition of the number 2 associated with the secret code to the key. Since the voter has chosen the secret code, number 2 is deducted from 3061 to obtain key 1849 to be used. Then, the process is the same as above.

Assuming now that the voter is coerced, and the coercer wants the voter to choose Jacques Frere whereas the voter wanted to vote for Bernard Bernardsen. The voter knows that, if he votes for Jacques Frere in front of the coercer, he will have to look for a way to subtract 4 modulo 10 (or add 6 modulo 10, which is the same) in order to have his vote finally decrypted into 3 corresponding to Bernard Bernardsen. When asked for a code, the voter will therefore enter "Salamander" because he knows that the system, after computing 2 (the secret code stored on the card) minus 6 (the dummy code chosen by the user) modulo 10, which yields 6, will add 6 to the vote. So, the voter should look at the difference between his secret code and the chosen code to know how the vote will be modified.

In summary, number 6 corresponding to the dummy "salamander" will be subtracted from the secret code 2, yielding 6. This result is added to number 7 corresponding to the candidate Jacques Frere yielding number 3 (corresponding to the true candidate Bernard Bernardsen) before being encrypted by key 1849 in the preferred embodiment. Then, after encryption, the vote 4172 is transmitted publicly. The trustees will ultimately decrypt the received encrypted vote to obtain 3 corresponding to Bernard Bernardsen.

With the alternative embodiment, there are two cases. Either the coercer do not force the voter to enter a specific code such as "salamander", or he forces the voter to enter such a specific code. In the first case, the voter chooses the dummy "salamander" such that the associated number 6 is deducted from the transformed key 3061 yielding the key 7405. Then, the number 7 corresponding to Jacques Frere is encrypted with the key 7405 yielding 4172 which is transmitted to the election authority. After decryption by the trustees, the decrypted vote is 3 corresponding to Bernard Bernardsen who is the candidate being chosen by the voter.

In the other case, the voter is forced to enter a specific dummy. If this dummy is different from "salamander" the vote which will be decrypted by the trustees can be false or blanco, but in any case unpredictable and unverifiable for the coercer.

Referendum

In case of a referendum, there is a very simple embodiment. The use of a dummy instead of a true word simply reverses the answer from "yes" into "no" or vice versa. It is sufficient that the real word adds nothing to the result and the false word adds one modulo 2 to the result. Accordingly, only one dummy is needed in this scenario.

Figure 4:
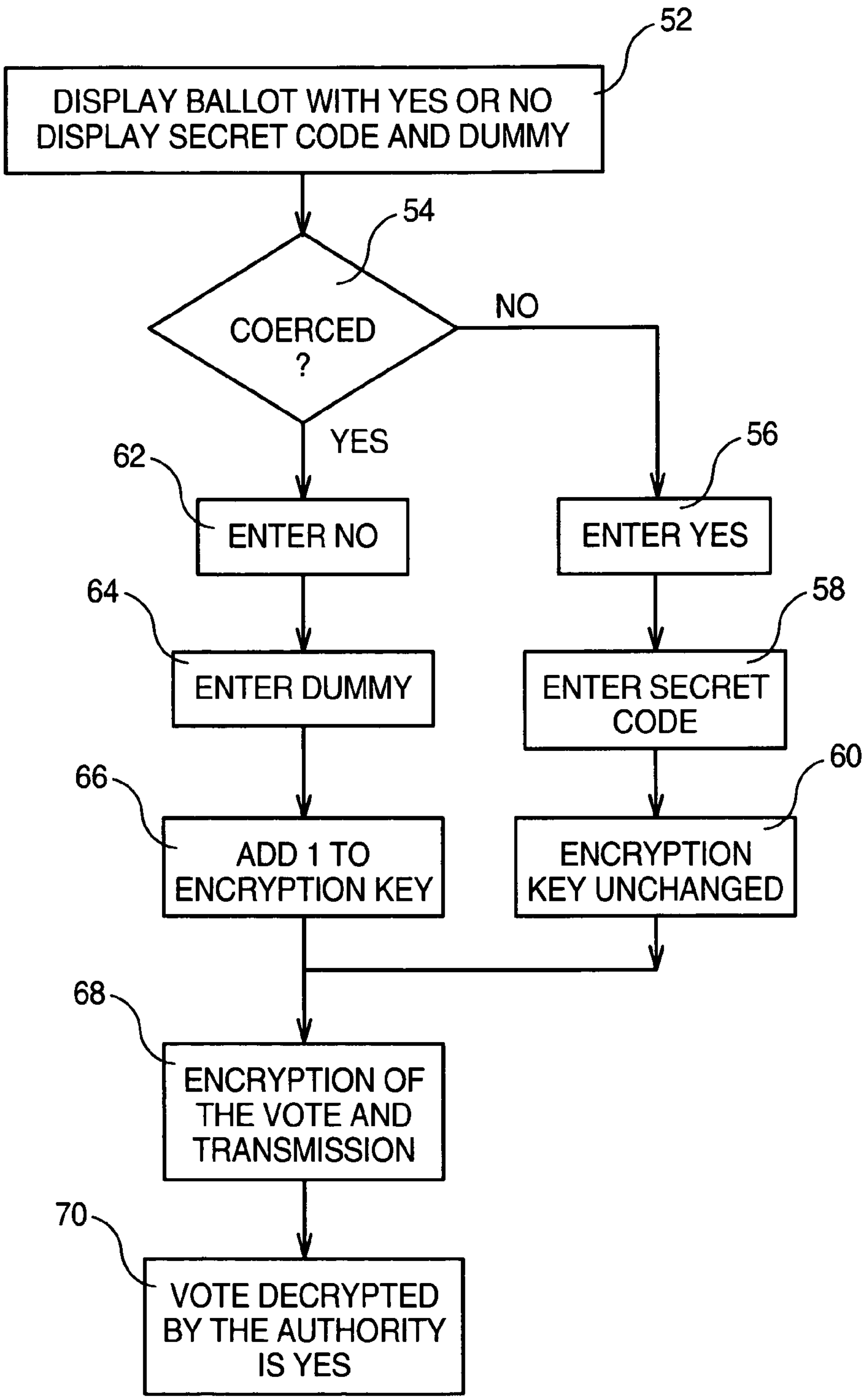
FIG. 4 is a flow chart representing the steps being implemented when a voter has to vote for a referendum.

As an example, assuming that the voter has chosen to vote YES, the steps being implemented are illustrated in FIG. 4. First, the system displays the ballot with YES (corresponding to 1) or NO (corresponding to 0) and also displays the secret code and the unique dummy (step 52). Then, the process is different whether the voter is coerced or not (step 54). If not, the voter enters YES (step 56), enters the secret code (step 58) and does not change the encryption key (step 60). Assuming now that a coercer wants the voter to choose for a vote NO (corresponding to 0), the voter chooses the vote NO (step 62) but also the dummy (step 64). But in this case, a bit 1 is added modulo 2 to the encryption key (step 66) yielding the vote corresponding to a YES which is the true choice of the voter. Then, the vote is encrypted (step 68) and transmitted to the election authority (step 70). Finally, after decryption, the vote received by the authority is the true vote YES.

While there have been shown and described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method for enabling coercion-free remote voting, comprising:

a voter providing a secret code;

generating a plurality of dummies in response to the secret code providing;

showing the plurality of dummies and the secret code to the voter in a sequentially numbered list, each of the plurality of dummies and the secret code associated with a number each of the sequentially numbered list;

providing a plurality of voting choices to the voter in a sequentially numbered list, each of the choices associated with a number each of the sequentially numbered list;

the voter voting for one of a plurality of voting choices and selecting one of the shown plurality of dummies and the secret code;

if the selecting comprises the voter selecting the secret code, entering the voter's vote into an election system; and if the selecting comprises the voter selecting one of the shown plurality of dummies:

selecting another of the plurality of voting choices as a function of a difference between the list number associated with the voter's vote and the list number associated with the another voting choice, the difference equal to a difference between the list number associated with the secret code and the list number associated with the selected shown dummy, and entering the selected another voting choice as the voter's vote into the election system; or nullifying the voter's vote within the election system.

2. The method of claim 1, wherein the selecting another of the plurality of voting choices and entering the selected another voting choice as the voter's vote into the election system, or the nullifying the voter's vote within the election system, further comprises entering a voter vote result into the election system different from a voting choice shown to the voter or to a coercer.

3. The method of claim 2, wherein the showing the plurality of dummies and the secret code to the voter further comprises allowing the voter to change at least one of the dummies to a specific displayed choice.

4. The method of claim 3, wherein the plurality of dummies and the plurality of voting choices comprise a quantity of three or more.

5. The method of claim 4, further comprising:

encrypting the voter's vote, the selected another voting choice or a voter's vote nullifying input by an encryption key defined for an election of the plurality of voting choices to generate an encrypted voting entry; and sending the encrypted voting entry to an election authority.

6. The method of claim 5, further comprising generating the encryption key by a sequential encryption by a group of trustees, each trustee encrypting a key received from a preceding trustee with his own key.

7. The method of claim 6, further comprising the election authority decrypting the encrypted voting entry by using the trustee sequential encryption keys in a reverse order from an order of application by the group of trustees.

8. The method of claim 7, wherein the encryption by each one of said trustees is an addition modulo 10.

* * * * *